(No Model.)
A. DITTMER.
METHOD OF SETTING DIAMONDS IN CUTTING TOOLS.
No. 529,611. Patented Nov. 20, 1894.
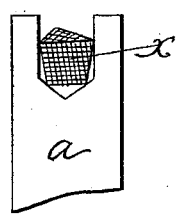 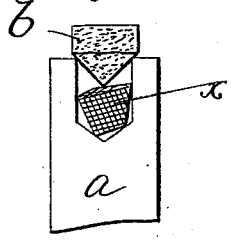 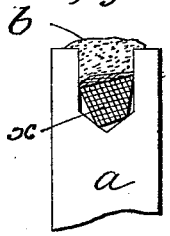 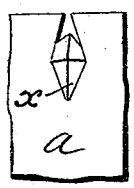
Fig. 1.   Fig. 2.   Fig. 3.   Fig. 4.
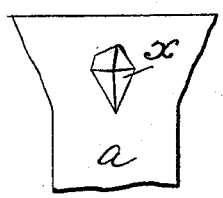  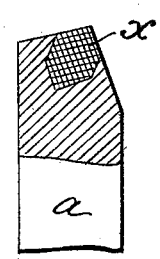
Fig. 5.   Fig. 6.   Fig. 7.
Attest
Inventor
A. Dittmer.
by Richards & Co
Attys.

UNITED STATES PATENT OFFICE.

ALBERT DITTMER, OF BERLIN, GERMANY.

METHOD OF SETTING DIAMONDS IN CUTTING-TOOLS.

SPECIFICATION forming part of Letters Patent No. 529,611, dated November 20, 1894.

Application filed August 15, 1893. Serial No. 483,165. (No model.)

*To all whom it may concern:*

Be it known that I, ALBERT DITTMER, technologist, a subject of the German Emperor, and a resident of 37 Havelberger Strasse, in the city of Berlin, in the German Empire, have invented a certain new and useful Improved Method of Setting Diamonds in Cutting-Tools and the Like and Apparatus for Same, of which the following is a specification.

This invention relates to an improved method of setting diamonds in stone cutting tools, saws, and the like, the object being to hold the diamonds in their setting in a ductile or a casting metal, in such a manner, that the position selected is not altered during the process of setting the same, as is frequently the case with the soldering process at present employed, where it is difficult to prevent the stone altering its position during setting, so that the chosen cutting edge of same is not in the desired position when the setting is completed.

According to the present invention a method is provided by which reliable results may be secured either where the setting takes place by forging or in a casting mold as will be hereinafter described.

In the annexed drawings Figures 1 to 7 illustrate various stages of the method of setting diamonds in such ductile metals as iron, steel, or bronze.

In the top of the bar or piece of metal $a$ is made a hole a little larger than the diamond $x$, to be set, so that the latter can be turned about in it to secure the desired position, which may be that shown in Fig. 1. To insure the diamond remaining in this position, a small cone of some plastic material, such as molding sand, loam, clay, or the like, is placed point downward on the diamond, as shown in Fig. 2, this form being employed so that the position of the diamond may be observed up to the filling in of the hole, which takes place by pressing down the said loam or clay as shown in Fig. 3. That side of the bar $a$ toward which the operative edge of the diamond is directed is now marked in a suitable manner (as by a chalked line) and the metal bar is laid with the end containing the diamond in a forge fire, and so far heated that the metal becomes thoroughly malleable and capable of being forged. When the bar is withdrawn, the edges of the hole are hammered together, as shown in Fig. 4, the blows being directed on those sides toward which the operative edge of the diamond is not turned, so that no shifting of the stone will take place. The loam or the like which has protected the diamond from the direct action of the fire is, by this hammering, knocked out in powder, and the bar is then worked upon by hammer blows directed upon its head (Fig. 5) to inclose the diamond, and is further worked upon from the sides (Fig. 6) to complete the inclosing. As the manner, in which the stone is lying in the bar is known, all that now remains to be done is to lay bare the operative edge by filing away the surrounding metal so that the bar will present somewhat the appearance shown in Fig. 7. This method of fastening serves for the production of the teeth for diamond saws and like tools, the set diamond being cut away from the bar, together with the necessary amount of metal, so that the so-called disks are produced, such disks being usually adjusted in rectangular spaces on the edge of a saw or other tool.

In some cases, to insure the better holding of the pieces of metal bearing the diamond in the tool, it is desirable to cut out the spaces of the latter so as to prevent the piece falling out even with the hardest usage of the tool.

Having now particularly described and ascertained the nature of my invention, I declare that what I claim, and wish to secure by Letters Patent, is—

The method of setting diamonds consisting in placing the diamond in a hole or socket in the tool, placing over the diamond when seated a piece of material to hold it in position said material being capable of being crushed or forced out of the opening when the metal is forced about the diamond and finally heating the material and hammering it about the diamond to hold the same and at the same time crush out the holding material.

In witness whereof I have hereunto signed my name in the presence of two subscribing witnesses.

ALBERT DITTMER.

Witnesses:
ARTHUR BAERMANN,
ALFRED MEISTER.